US012782858B2

(12) United States Patent
Fukasawa et al.

(10) Patent No.: US 12,782,858 B2
(45) Date of Patent: Nov. 3, 2026

(54) IMAGE FORMING SYSTEM THAT MANAGES CONSUMPTION INFORMATION OF VALID CONSUMABLE ITEM AMONG PLURALITY OF CONSUMABLE ITEMS

(71) Applicant: KYOCERA Document Solutions Inc., Osaka (JP)

(72) Inventors: Yuki Fukasawa, Osaka (JP); Ryota Kikuchi, Osaka (JP); Masanori Taguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/182,421

(22) Filed: Apr. 17, 2025

(65) Prior Publication Data

US 2025/0328102 A1 Oct. 23, 2025

(30) Foreign Application Priority Data

Apr. 19, 2024 (JP) ................................ 2024-068695

(51) Int. Cl.
*G03G 15/00* (2006.01)
*G03G 21/18* (2006.01)

(52) U.S. Cl.
CPC ....... *G03G 15/556* (2013.01); *G03G 21/1882* (2013.01); *G03G 21/1889* (2013.01); *G03G 21/1892* (2013.01)

(58) Field of Classification Search
CPC ............... G03G 15/553; G03G 15/556; G03G 21/1882; G03G 21/1889; G03G 21/1892
See application file for complete search history.

(56) References Cited

U.S. PATENT DOCUMENTS

2008/0267642 A1* 10/2008 Hadano .............. G03G 15/5079 399/27
2013/0028616 A1 1/2013 Kunihiro et al.
(Continued)

FOREIGN PATENT DOCUMENTS

JP 2019056802 A 4/2019
JP 2023140317 A 10/2023
JP 2025052544 A 4/2025

*Primary Examiner* — Carla J Therrien
(74) *Attorney, Agent, or Firm* — IP Business Solutions, LLC.

(57) ABSTRACT

An image forming system includes an image forming apparatus and an information processing apparatus. In the image forming apparatus, a first controller designates consumable items that can supply a consumable material, as valid consumable items, generates consumable item setting information indicating the valid consumable items, causes a first communication device to transmit the consumable item setting information to the information processing apparatus, generates consumption information of the valid consumable items, when the first communication device receives a request for the consumption information, and causes the first communication device to transmit the consumption information to the information processing apparatus. In the information processing apparatus, a second controller causes a second communication device to transmit the request for the consumption information to the image forming apparatus, and stores the consumption information of each of the valid consumable items in a storage device, when the second communication device receives the consumption information.

9 Claims, 13 Drawing Sheets

(56) References Cited

U.S. PATENT DOCUMENTS

| | | | | |
|---|---|---|---|---|
| 2016/0170356 | A1* | 6/2016 | Mabuchi | G03G 15/0872 399/27 |
| 2019/0086835 | A1 | 3/2019 | Nohara et al. | |
| 2022/0011986 | A1* | 1/2022 | Azechi | G06F 3/1285 |
| 2023/0351133 | A1 | 11/2023 | Morales | |
| 2024/0345505 | A1* | 10/2024 | Yoshioku | G03G 15/0867 |
| 2024/0393716 | A1* | 11/2024 | Misu | G03G 15/0879 |

* cited by examiner

Fig.9A

CONSUMPTION INFORMATION SD OF UPPER TONER CONTAINER 52K SD
CONSUMPTION INFORMATION SD OF UPPER TONER CONTAINER 52Y SD
CONSUMPTION INFORMATION SD OF UPPER TONER CONTAINER 52C SD
CONSUMPTION INFORMATION SD OF UPPER TONER CONTAINER 52M SD
CONSUMPTION INFORMATION SD OF LOWER TONER CONTAINER 52K SD
CONSUMPTION INFORMATION SD OF LOWER TONER CONTAINER 52Y SD
CONSUMPTION INFORMATION SD OF LOWER TONER CONTAINER 52C SD
CONSUMPTION INFORMATION SD OF LOWER TONER CONTAINER 52M SD

Fig.9B

CONSUMPTION INFORMATION SD OF LOWER TONER CONTAINER 52K SD
CONSUMPTION INFORMATION SD OF LOWER TONER CONTAINER 52Y SD
CONSUMPTION INFORMATION SD OF LOWER TONER CONTAINER 52C SD
CONSUMPTION INFORMATION SD OF LOWER TONER CONTAINER 52M SD

Fig.9C

CONSUMPTION INFORMATION SD OF UPPER TONER CONTAINER 52K SD
CONSUMPTION INFORMATION SD OF LOWER TONER CONTAINER 52K SD
CONSUMPTION INFORMATION SD OF LOWER TONER CONTAINER 52Y SD
CONSUMPTION INFORMATION SD OF LOWER TONER CONTAINER 52C SD
CONSUMPTION INFORMATION SD OF LOWER TONER CONTAINER 52M SD

IMAGE FORMING SYSTEM THAT MANAGES CONSUMPTION INFORMATION OF VALID CONSUMABLE ITEM AMONG PLURALITY OF CONSUMABLE ITEMS

INCORPORATION BY REFERENCE

This application claims priority to Japanese Patent Application No. 2024-068695 filed on Apr. 19, 2024, the entire contents of which are incorporated by reference herein.

BACKGROUND

The present disclosure relates to an image forming system including an image forming apparatus, and an information processing apparatus that performs data communication with the image forming apparatus, and in particular to a technique to collect consumption information of consumable items of the image forming apparatus, with the information processing apparatus.

The image forming apparatus can be broadly classified into an electrophotographic image forming apparatus, configured to stick toner onto a recording sheet, thereby forming an image on the recording sheet, and an ink jet image forming apparatus, configured to eject ink onto the recording sheet, thereby forming an image on the recording sheet. The electrophotographic image forming apparatus includes a toner container for storing the toner therein, and supplies the toner from the toner container. The ink jet image forming apparatus includes an ink cartridge for storing the ink therein, and supplies the ink from the ink cartridge.

In the case of a known technique to estimate the usage of consumable items, an offline estimation device acquires version information, setting information, and color printing resource of a digital front end (DFE), from the printing apparatus. The offline estimation device selects a raster image processor (RIP) that can be utilized in the printing system, using the version information of the DFE. The offline estimation device sets up the RIP according to the setting information, and provides the estimation of usage of the ink or toner, using the RIP set up as above.

SUMMARY

The disclosure proposes further improvement of the foregoing technique.

In an aspect, the disclosure provides an image forming system including an image forming apparatus and an information processing apparatus. The image forming apparatus includes an image forming device, a plurality of consumable items, a first communication device, and a first controller. The image forming device forms an image on a recording sheet. The plurality of consumable items each supply a consumable material to be used for forming the image. The first communication device performs data communication with the information processing apparatus. The first controller includes a processor, and is configured to, when the processor executes a control program, designate one or more consumable items that can supply a consumable material, as valid consumable items, among the plurality of consumable items, generate consumable item setting information indicating the valid consumable items, cause the first communication device to transmit the consumable item setting information to the information processing apparatus, generate the consumption information of the valid consumable items, when the first communication device receives a request for transmission of the consumption information of the valid consumable items, and cause the first communication device to transmit the consumption information to the information processing apparatus. The information processing apparatus includes a second communication device, a storage device, and a second controller. The second communication device performs data communication with the image forming apparatus. The second controller includes a processor, and is configured to, when the processor executes a control program, identify the valid consumable items indicated by the consumable item setting information, when the second communication device receives the consumable item setting information, cause the second communication device to transmit the request for transmission of the consumption information of the valid consumable items, with respect to each of the valid consumable items, to the image forming apparatus, and store the consumption information of each of the valid consumable items in the storage device, when the second communication device receives the consumption information.

BRIEF DESCRIPTION OF THE DRAWINGS

FIG. 9A to FIG. 9C are schematic drawings each showing an example of the consumption information of the toner containers.

DETAILED DESCRIPTION

Figure 1:
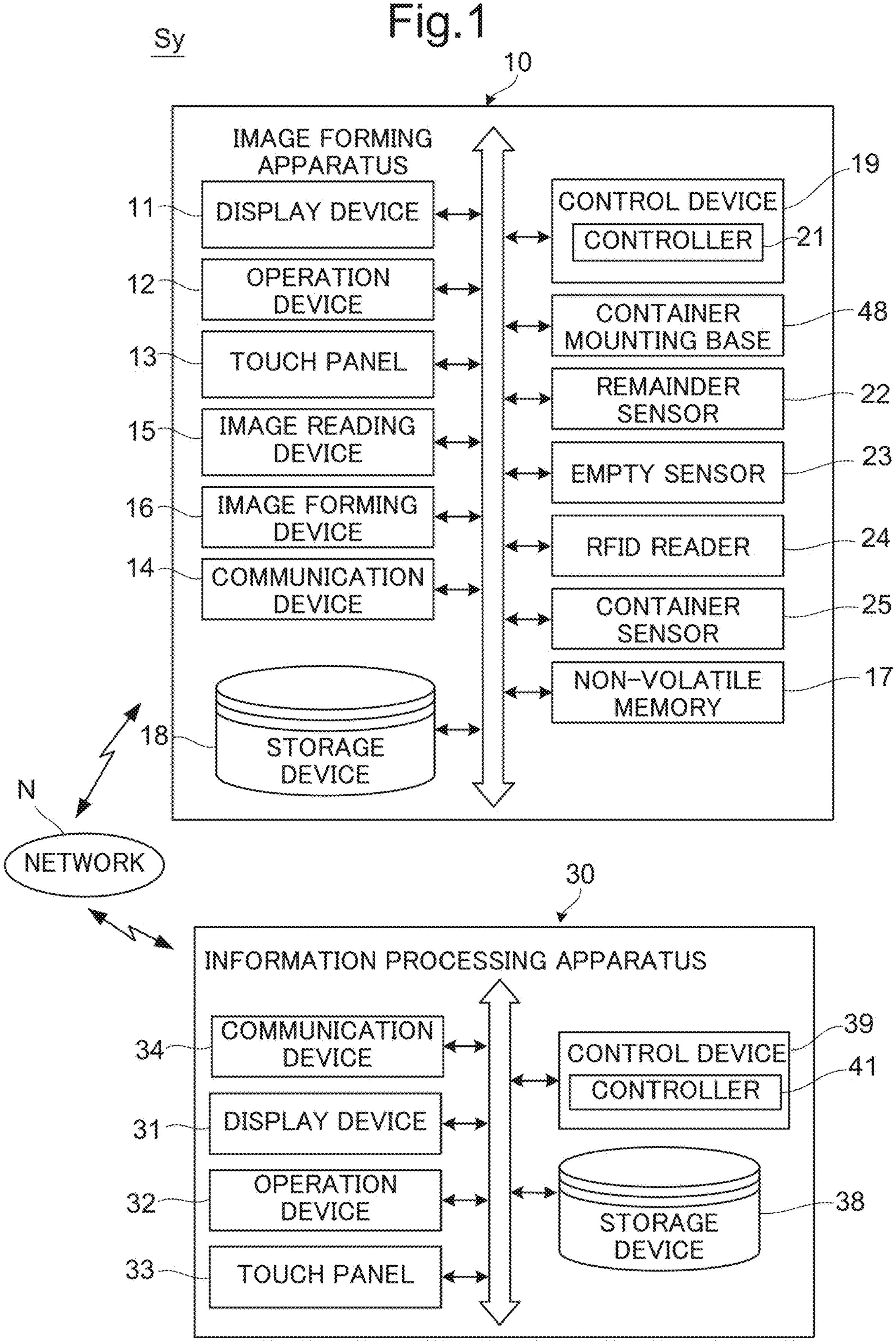
FIG. 1 is a block diagram showing a configuration of an image forming apparatus and an information processing apparatus, in an image forming system.

Hereafter, an image forming system according to an embodiment of the disclosure will be described, with reference to the drawings. FIG. 1 is a block diagram showing a configuration of an image forming apparatus 10 and an information processing apparatus 30, in the image forming system Sy according to the embodiment of the disclosure. In the image forming system Sy, the image forming apparatus 10 and the information processing apparatus 30 are connected via a network, such as an intranet.

In the image forming system Sy, the image forming apparatus 10 is a multifunction peripheral (MFP) having a plurality of functions, such as copying, printing, and scanning.

The image forming apparatus 10 includes a display device 11, an operation device 12, a touch panel 13, a communication device 14, an image reading device 15, an image forming device 16, a non-volatile memory 17, a storage device 18, a control device 19, a container mounting base 48, remainder sensors 22, empty sensors 23, radio frequency identification (RFID) readers 24, and container sensors 25. These components can transmit and receive data and signals to and from one another, via a bus.

The display device 11 includes, for example, a liquid crystal display (LCD) or an organic light-emitting diode (OLED) display.

The touch panel 13 is overlaid on the screen of the display device 11. The touch panel 13 detects a contact (touch) of the user's finger made thereon, along with the touched position, and outputs a detection signal indicating the coordinate of the touched position, to the control device 19 acting as a controller 21. Accordingly, the instruction can be inputted through the touch panel 13, using a graphical user interface (GUI) displayed on the screen of the display device 11. In this case, the touch panel 13 serves as a part of the operation device, through which the user's instruction inputted.

The operation device 12 includes hard keys such as a numeric keypad, an enter key, and a start key. The operation device 12 receives an input of the user's instruction, according to the operation performed on those keys.

The image reading device 15 includes an image sensor, such as a CCD sensor or a contact image sensor (CIS), which optically reads an image of a document M. The image reading device 15 generates image data representing the image of the document M.

The image forming device 16 includes a photoconductor drum, a charging device, an exposure device, a developing device, and a transfer device. The charging device uniformly charges the surface of the photoconductor drum. The exposure device exposes the surface of the photoconductor drum to light, thereby forming an electrostatic latent image on the surface of the photoconductor drum. The developing device develops the electrostatic latent image on the surface of the photoconductor drum, into a toner image. The transfer device transfers the toner image on the surface of the photoconductor drum, to a recording sheet. The image forming device 16 forms an image represented by the image data, on the recording sheet.

The communication device 14 is a communication interface including a communication module such as a LAN chip. The communication device 14 is connected to the information processing apparatus 30 via a network N (e.g., intranet), and performs data communication with the information processing apparatus 30.

The storage device 18 is a large-capacity storage device such as a solid-state drive (SSD) or a hard disk drive (HDD). The storage device 18 contains various application programs and various types of data.

The control device 19 includes a processor, a random-access memory (RAM), a read-only memory (ROM), and so forth. The processor is, for example, a central processing unit (CPU), an application specific integrated circuit (ASIC), or a micro processing unit (MPU). The control device 19 serves as the controller 21, when the processor executes a control program stored in the ROM or the storage device 18.

The controller 21 executes overall control of the image forming apparatus 10. The control device 19 is connected to the display device 11, the operation device 12, the touch panel 13, the communication device 14, the image reading device 15, the image forming device 16, the non-volatile memory 17, the storage device 18, the container mounting base 48, the remainder sensors 22, the empty sensors 23, the RFID readers 24, and the container sensors 25.

The controller 21 serves to control the operation of the cited components, and transmit and receive signals and data to and from those components. The controller 21 acts as a processing device that executes various types of functions. The controller 21 is configured to control the display device 11 and the communication device 14.

The container mounting base 48, the remainder sensor 22, the empty sensor 23, the RFID reader 24, and the container sensor 25 will be subsequently described in detail.

In the image forming system Sy, the information processing apparatus 30 is connected to the image forming apparatus 10 via the network N, and transmits and receives data, to and from the image forming apparatus 10. The information processing apparatus 30 includes a display device 31, an operation device 32, a touch panel 33, a communication device 34, a storage device 38, and a control device 39. These components can transmit and receive data and signals to and from one another, via a bus.

The display device 31 includes, for example, an LCD or an OLED display.

The touch panel 33 is overlaid on the screen of the display device 31. The touch panel 33 detects a contact (touch) of the user's finger made thereon, along with the touched position, and outputs a detection signal indicating the coordinate of the touched position, to the control device 39 acting as a controller 41. Accordingly, the instruction can be inputted through the touch panel 33, using a graphical user interface (GUI) displayed on the screen of the display device 31.

The operation device 32 includes hard keys such as a numeric keypad, an enter key, and a start key. The operation device 32 receives an input of the user's instruction, according to the operation performed on those keys.

The communication device 34 is a communication interface. The communication device 34 is connected to the image forming apparatus 10 via the network N, and performs data communication with the image forming apparatus 10.

The storage device 38 is a large-capacity storage device such as an SSD or an HDD. The storage device 38 contains various programs and various types of data.

The control device 39 includes a processor, a RAM, a ROM, and so forth. The control device 39 serves as the controller 41, when the processor executes a control program stored in the ROM or the storage device 38.

The controller 41 executes overall control of the information processing apparatus 30. The control device 39 is connected to the display device 31, the operation device 32, the touch panel 33, the communication device 34, and the storage device 38.

The controller 41 serves to control the operation of the cited components, and transmit and receive signals and data to and from those components. The controller 41 acts as a processing device that executes various types of functions. The controller 41 is configured to control the display device 31 and the communication device 34.

Figure 2:
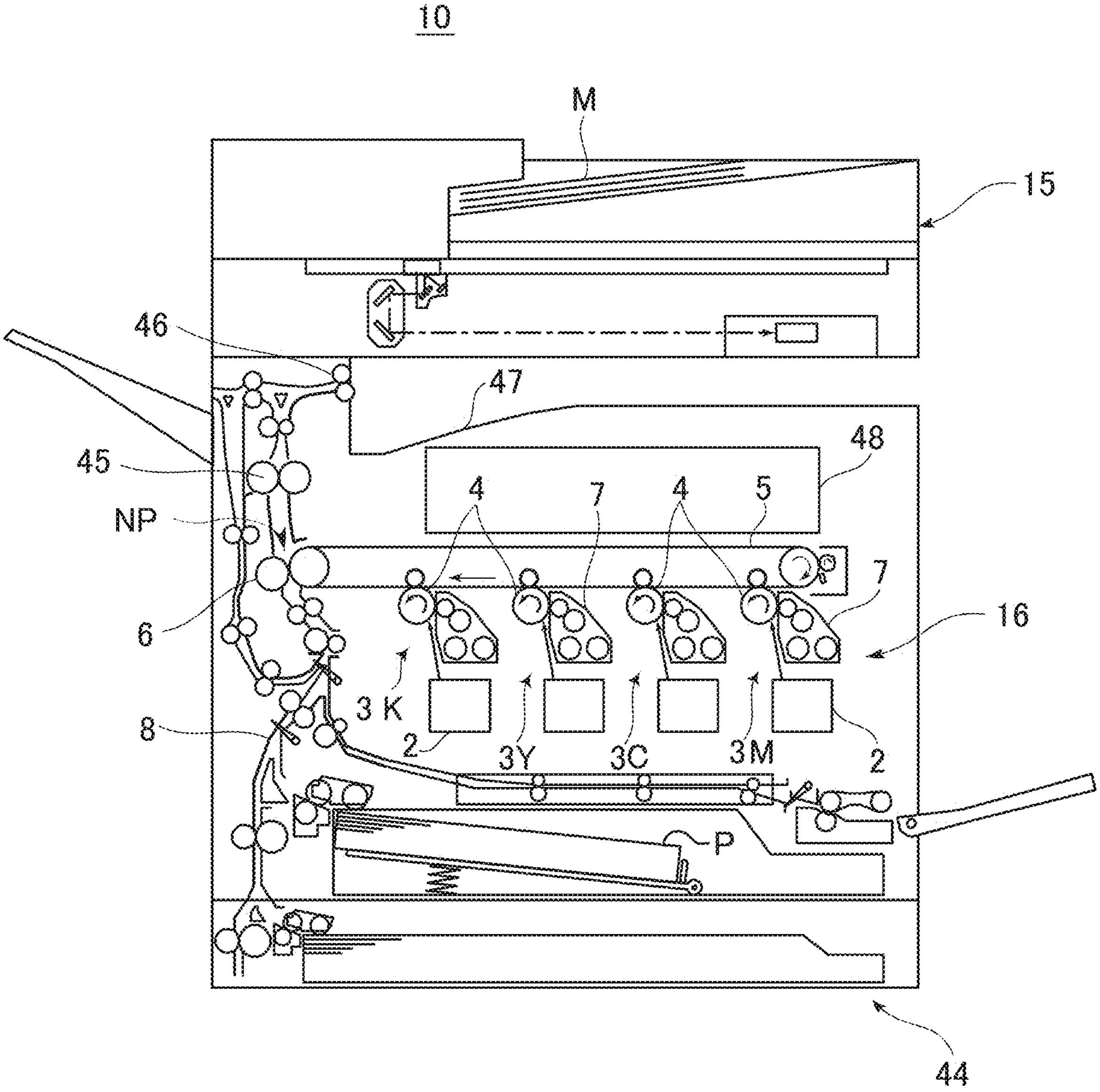
FIG. 2 is a schematic cross-sectional view showing the image forming apparatus.

FIG. 2 is a schematic cross-sectional view showing the image forming apparatus 10, according to the embodiment of the disclosure. As shown in FIG. 2, the image forming apparatus 10 includes the image reading device 15 and the image forming device 16.

The image forming device 16 includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 4 is uniformly charged and exposed, to thereby form an electrostatic latent image on the surface of the photoconductor drum 4, and then the electrostatic latent image on the surface of the photoconductor drum 4 is developed into a toner image, which is transferred to an intermediate transfer belt 5, as primary transfer. As result, a colored toner image is formed on the intermediate transfer belt 5. The colored toner image is transferred, as secondary transfer, to the recording sheet P transported from a sheet feeding device 44 along a transport route 8, at a nip region N between the intermediate transfer belt 5 and a secondary transfer roller 6.

After the secondary transfer, a fixing device 45 heats and presses the recording sheet P, to fix the toner image onto the recording sheet P, by thermal compression. The recording sheet P, having the toner image fixed thereon, is delivered to an output tray 47, via a delivery roller 46.

On the upper side of the image forming units 3M, 3C, 3Y, and 3K, the container mounting base 48, configured to supply the magenta toner, the cyan toner, the yellow toner, and the black toner, to the respective developing devices 7 of the image forming units 3M, 3C, 3Y, and 3K, is provided.

Figure 3:
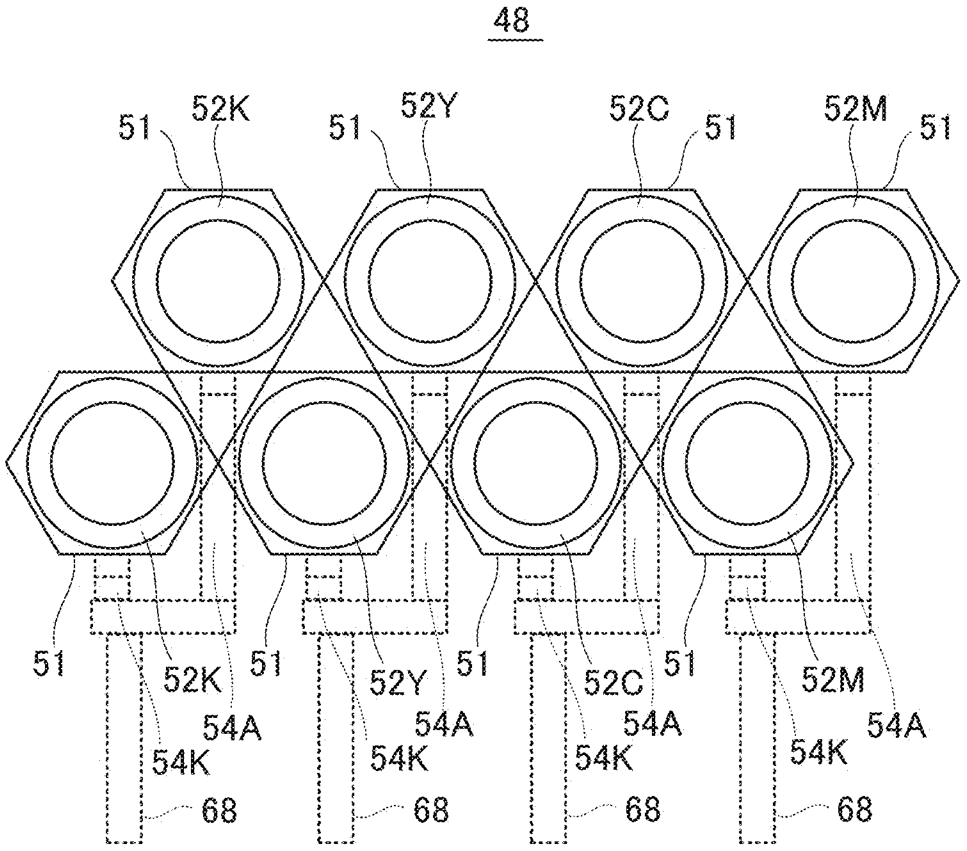
FIG. 3 is a schematic front view showing a container mounting base.
Figure 4:
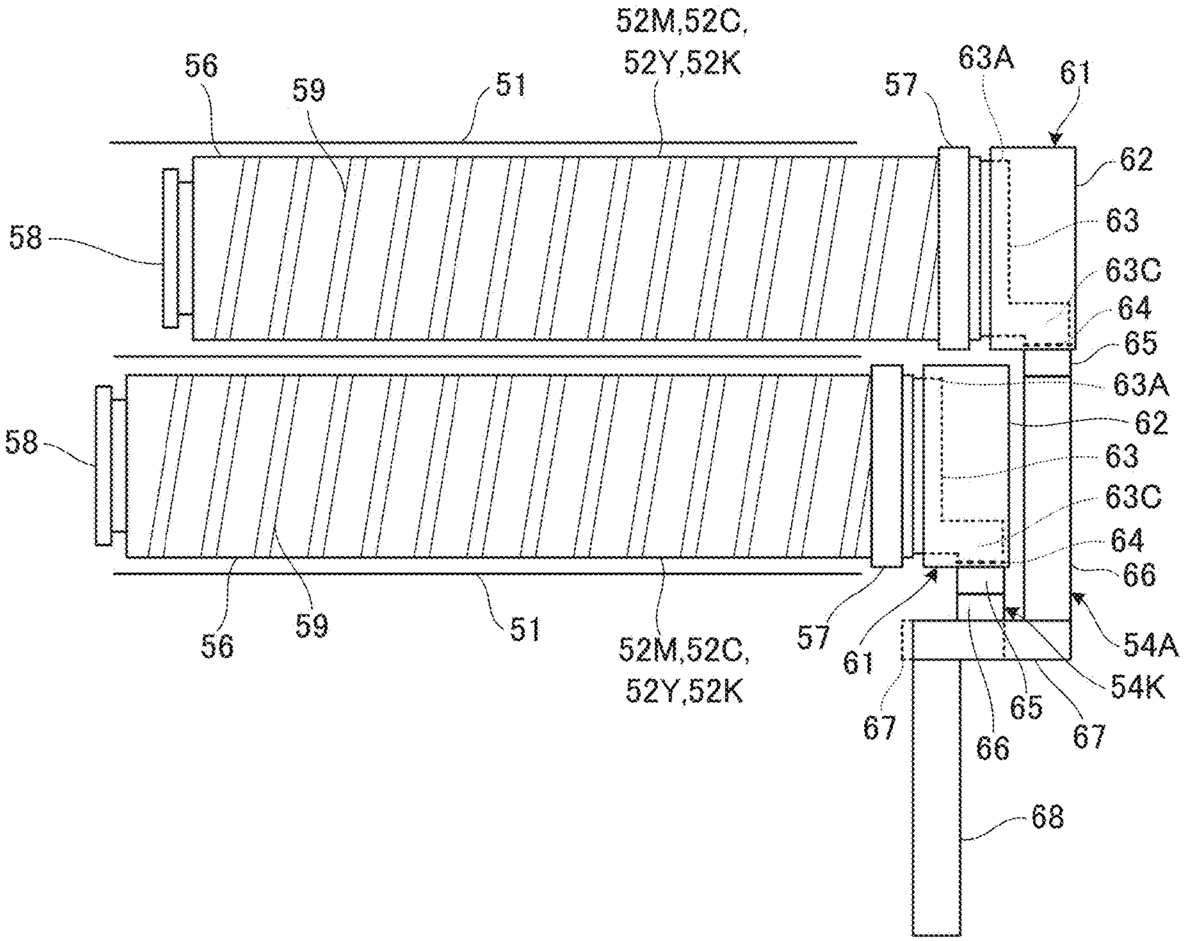
FIG. 4 is a schematic side view showing the container mounting base.

FIG. 3 is a schematic drawing showing the container mounting base 48, seen from the front side of the image forming apparatus 10. FIG. 4 is a schematic side view showing the container mounting base 48. The container mounting base 48 is a mechanism on which the toner containers are mounted. The operation of the functional parts in the container mounting base 48 is controlled by the controller 21.

The container mounting base 48 includes eight cylindrical housings 51 of a hexagonal shape, four sets of toner transport units 54A/54K, and eight toner containers 52M, 52C, 52Y, and 52K removably mounted in the respective cylindrical housings 51.

The four sets of toner transport units 54A/54K are respectively allocated to a pair of toner containers 52M, a pair of toner containers 52C, a pair of toner containers 52Y, and a pair of toner containers 52K.

As shown in FIG. 3, the eight cylindrical housings 51, having a hexagonal shape when viewed from the front side, are stacked in two stages, namely an upper and lower stages. As shown in FIG. 3 and FIG. 4, four cylindrical toner containers 52M, 52C, 52Y, and 52K are respectively inserted into the four cylindrical housings 51 on the upper stage, in the horizontal direction, and likewise, four cylindrical toner containers 52M, 52C, 52Y, and 52K are respectively inserted into the four cylindrical housings 51 on the lower stage, in the horizontal direction.

The toner container 52M on the upper stage and the toner container 52M on the lower stage, which are obliquely aligned in the up-down direction, accommodate therein the magenta toner, and supply the magenta toner to the developing device 7 of the image forming unit 3M, through the corresponding toner transport unit 54A/54K.

The toner container 52C on the upper stage and the toner container 52C on the lower stage, which are obliquely aligned in the up-down direction, accommodate therein the cyan toner, and supply the cyan toner to the developing device 7 of the image forming unit 3C, through the corresponding toner transport unit 54A/54K.

The toner container 52Y on the upper stage and the toner container 52Y on the lower stage, which are obliquely aligned in the up-down direction, accommodate therein the yellow toner, and supply the yellow toner to the developing device 7 of the image forming unit 3Y, through the corresponding toner transport unit 54A/54K.

The toner container 52K on the upper stage and the toner container 52K on the lower stage, which are obliquely aligned in the up-down direction, accommodate therein the black toner, and supply the black toner to the developing device 7 of the image forming unit 3K, through the corresponding toner transport unit 54A/54K.

The toner containers 52M, 52C, 52Y, and 52K each include a hollow cylindrical container 56 and a support member 61. The toner is accommodated inside the hollow cylindrical container 56. The rear end portion of the cylindrical container 56 is open, and the front end portion thereof is closed. A gear 57 is provided around the outer periphery of the rear end portion of the cylindrical container 56, and a knob 58 is provided at the front end of the cylindrical container 56.

A helical groove 59 is formed around the outer periphery of the cylindrical container 56. The helical groove 59 forms a helical protrusion, protruding into inside of the cylindrical container 56. Inside the cylindrical housing 51, the cylindrical container 56 is supported so as to rotate about the axial center of the cylindrical container 56. The gear 57 on the rear end portion of the cylindrical container 56 is meshed with a drive gear provided on the side of the image forming device 16.

When the drive gear is made to rotate by a motor, the gear 57 is made to rotate by the drive gear, and so is the cylindrical container 56. Because of the rotation of the cylindrical container 56, the helical protrusion protruding into inside of the cylindrical container 56 transports the toner in the cylindrical container 56 toward the rear end.

The support member 61 includes a case 62, a fitting lid 63, and a shutter 64. The case 62 is retained and fixed on the side of the image forming device 16, with the toner containers 52M, 52C, 52Y, and 52K mounted in the cylindrical housing 51. The fitting lid 63 is supported inside the case 62, and fixed together with the case 62.

The fitting lid 63 includes a cylindrical portion 63A rotatably fitted in the opening on the rear end portion of the cylindrical container 56, and a toner outlet 63C provided on the lower side of the cylindrical portion 63A. The rear end of the cylindrical portion 63A is closed. The outer periphery of the cylindrical portion 63A is rotatably and tightly fitted to the inner circumferential surface of the opening on the rear end portion of the cylindrical container 56. Although the cylindrical container 56 rotates, the cylindrical portion 63A remains immobile, and the toner is kept from leaking through between the cylindrical container 56 and the cylindrical portion 63A.

The shutter 64 is located at the toner outlet 63C of the fitting lid 63. When the toner container is mounted in the cylindrical housing 51, the shutter 64 moves so as to open the toner outlet 63C, and when the toner container is drawn out from the cylindrical housing 51, the shutter 64 moves in the opposite direction, so as to close the toner outlet 63C.

As described above, because of the rotation of the cylindrical container 56, the toner in the cylindrical container 56 is transported forward by the helical protrusion protruding into inside of the cylindrical container 56. Then the toner is led to the inside of the cylindrical portion 63A of the fitting lid 63, and discharged downward through the toner outlet 63C of the fitting lid 63.

The toner transport units 54A/54K fixed on the side of the image forming device 16 each include a receptacle 65, a vertical transport pipe 66, a horizontal transport pipe 67, and a common merging transport pipe 68. The receptacle 65 of the toner transport unit 54A is connected to the toner outlet 63C of the fitting lid 63 of the toner container on the upper stage. The receptacle 65 of the toner transport unit 54K is connected to the toner outlet 63C of the fitting lid 63 of the toner container on the lower stage.

Each of the toner transport units 54A/54K receives the toner discharged through the toner outlet 63C of the fitting lid 63 of the toner container, with the receptacle 65, and guides the toner to the horizontal transport pipe 67 through the vertical transport pipe 66. Through the vertical transport pipe 66, the toner is transported by gravity drop. In the horizontal transport pipe 67, a screw provided inside the horizontal transport pipe 67 is made to rotate, so as to transport the toner in the horizontal direction.

In each set of the toner transport unit 54A/54K, which receives the toner of the same color through the toner outlet 63C, from one of the toner containers 52M, 52C, 52Y, and 52K on the upper and lower stages, obliquely aligned in the up-down direction, the horizontal transport pipe 67 is connected to the upper end portion of the merging transport pipe 68. The toner is guided to the merging transport pipe 68 through the horizontal transport pipe 67 thus to be merged, and the merged toner is supplied to the developing device 7, through the merging transport pipe 68.

Accordingly, the magenta toner, accommodated in the toner containers 52M on the upper and lower stages, is supplied to the developing device 7 of the image forming unit 3M, through the toner transport unit 54A/54K. The cyan toner, accommodated in the toner containers 52C on the upper and lower stages, is supplied to the developing device 7 of the image forming unit 3C, through the toner transport unit 54A/54K.

The yellow toner, accommodated in the toner containers 52Y on the upper and lower stages, is supplied to the developing device 7 of the image forming unit 3Y, through the toner transport unit 54A/54K. The black toner, accommodated in the toner containers 52K on the upper and lower stages, is supplied to the developing device 7 of the image forming unit 3K, through the toner transport unit 54A/54K.

In each of the cylindrical housings 51, the empty sensor 23 (shown in FIG. 1) is provided, to detect the empty state of one of the toner containers 52M, 52C, 52Y, and 52K. The empty sensor 23 may be, for example, a magnetic permeability sensor, which detects the presence of the toner inside the vertical transport pipe 66.

When the toner inside the vertical transport pipe 66 is not detected by the empty sensor 23 provided on the vertical transport pipe 66 of the toner transport unit 54A, which receives the toner from the toner container on the upper stage, the toner container on the upper stage is empty. When the toner inside the vertical transport pipe 66 is not detected by the empty sensor 23 provided on the vertical transport pipe 66 of the toner transport unit 54K, which receives the toner from the toner container on the lower stage, the toner container on the lower stage is empty.

In each of the cylindrical housings 51, the remainder sensor 22 (shown in FIG. 1) is provided, to detect the remaining amount of the toner inside the toner container. The remainder sensor 22 may be, for example, constituted of a magnetic sensor.

As shown in FIG. 1, the image forming apparatus 10 includes, in addition to the container mounting base 48, the remainder sensors 22, and the empty sensors 23, the RFID readers 24 and the container sensors 25.

The RFID reader 24 is provided for each of the cylindrical housings 51, to read the information about one of the toner containers 52M, 52C, 52Y, and 52K inserted into the cylindrical housing 51, from an RFID tag provided on the corresponding toner container. The toner containers 52M, 52C, 52Y, and 52K are each provided with the RFID tag, in which the information about the corresponding toner container is stored.

The container sensor 25 is provided for each of the cylindrical housings 51, to detect the presence of one of the toner containers 52M, 52C, 52Y, and 52K inserted into the cylindrical housing 51. The container sensor 25 may be, for example, a limit switch that turns on and off depending on whether the toner container 52M, 52C, 52Y, or 52K is mounted in the cylindrical housing 51.

Here, further details of the container mounting base 48 are disclosed in JP-A-No. 2025-52544 and JP-A-No. 2019-56802, filed earlier by the present applicant.

With the image forming apparatus 10 configured as above, the user can, for example, set a document M on the image reading device 15, and presses the start key on the operation device 12. In response to the press of the start key, the controller 21 causes the image reading device 15 to read the image of the document M, and causes the image forming device 16 to print the image of the document M on the recording sheet P.

The controller 21 of the image forming apparatus 10 generates the information on the consumption of the toner, with respect to each of the toner containers 52M, 52C, 52Y, and 52K on the container mounting base 48, and transmits the generated information to the information processing apparatus 30, through the communication device 14. Upon receipt of the information on the toner consumption of each of the toner containers 52M, 52C, 52Y, and 52K, through the communication device 34, the controller 41 of the information processing apparatus 30 stores the received information in the storage device 38.

However, in the case of transmitting and receiving the information on the toner consumption, between the image forming apparatus 10 and the information processing apparatus 30, with respect to each of the toner containers 52M, 52C, 52Y, and 52K, it is preferable to reduce the communication volume of the information, thereby making the communication more efficient, while sufficiently transmitting the necessary information.

In this embodiment, therefore, the controller 21 of the image forming apparatus 10 designates the toner container from which the toner may be supplied, as valid toner container. The controller 21 generates consumable item setting information KD, indicating the mounting position (upper stage or lower stage, and the order of alignment in the horizontal direction) of the toner container designated as the valid toner container, and transmits the consumable item setting information KD to the information processing apparatus 30, through the communication device 14.

Although the controller 21 generates the consumable item setting information KD also with respect to the toner container not designated as the valid toner container, the controller 21 does not transmit the consumable item setting information KD to the information processing apparatus 30, through the communication device 14. Alternatively, the controller 21 may keep from generating the consumable item setting information KD, with respect to the toner container not designated as the valid toner container.

Upon receipt of the consumable item setting information KD through the communication device 34, the controller 41 of the information processing apparatus 30 identifies the mounting position of the toner containers indicated by the consumable item setting information KD, and transmits the information indicating the mounting position of the toner containers, and a request for transmission of the consumption information SD, with respect to each of the toner containers, to the image forming apparatus 10 through the communication device 34.

Upon receipt of the information indicating the mounting position of the toner containers, and the request for transmission of the consumption information SD, through the communication device 14, the controller 21 of the image forming apparatus 10 generates the consumption information SD about the toner container corresponding to the mounting position received, and transmits the information indicating the mounting position of the toner container (or information indicating the toner container corresponding to the mounting position, the same applies hereinafter), and the consumption information SD about the toner container, to the information processing apparatus 30 through the communication device 14.

Upon receipt of the information indicating the mounting position of the toner container, and the consumption information SD about the toner container, through the communication device 34, the controller 41 of the information processing apparatus 30 stores the mounting position of the toner container and the consumption information SD about the toner container, in the storage device 38, and displays a warning based on the consumption information SD about the toner container, on the screen of the display device 31.

Thus, the consumption information SD about the toner container is transmitted from the image forming apparatus 10 to the information processing apparatus 30 and collected therein, with respect to each of the valid toner containers indicated by the consumable item setting information KD, in other words the toner containers from which the toner may be supplied. The consumption information SD is not transmitted, with respect to the toner container from which the toner is not to be supplied. Therefore, the consumption information SD is transmitted, only with respect to the toner containers that really need to be managed.

Figure 5:
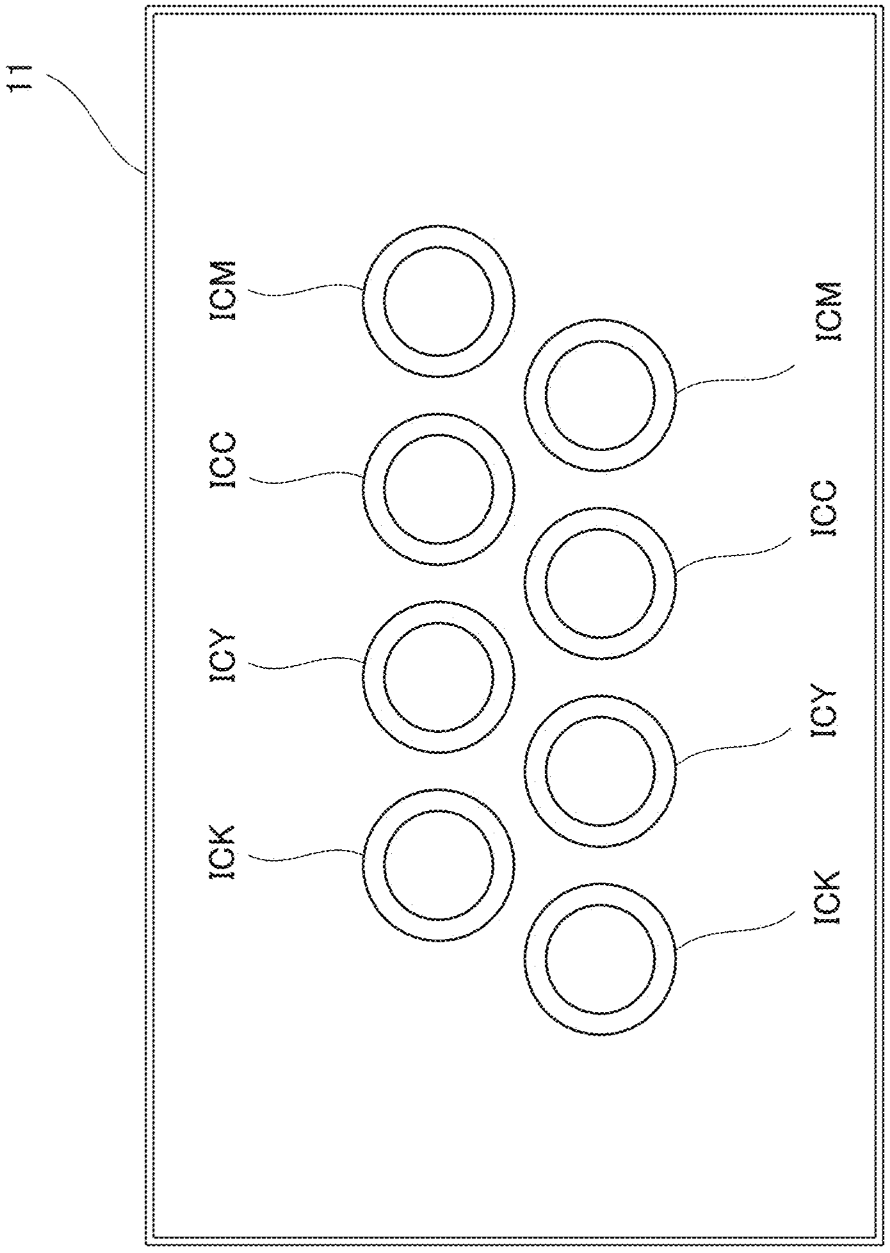
FIG. 5 is a schematic drawing showing examples of icons of toner containers, displayed on the screen of a display device of the image forming apparatus.

The consumable item setting information KD is specified by a service person through the operation device 12, at the time of the initial setting of the image forming apparatus 10, and stored in the non-volatile memory 17. For example, the controller 21 of the image forming apparatus 10 displays icons ICM, ICC, ICY, and ICK, respectively corresponding to the toner containers 52M, 52C, 52Y, and 52K on the upper stage, and icons ICM, ICC, ICY, and ICK, respectively corresponding to the toner containers 52M, 52C, 52Y, and 52K on the lower stage, on the screen of the display device 11, as shown in FIG. 5.

The service person selects the icon corresponding to the toner container to be designated as the valid toner container, out of the icons ICM, ICC, ICY, and ICK displayed on the display device 11, and touches the selected icon. The controller 21 designates the toner container, corresponding to the icon touched through the touch panel 13, as the valid toner container, generates the consumable item setting information KD indicating the mounting position of the valid toner container, and stores the consumable item setting information KD generated, in the non-volatile memory 17.

When the cylindrical container 56 of the toner container 52M, 52C, 52Y, or 52K mounted in the cylindrical housing 51 is made to rotate, the toner is supplied from the toner container. To be more specific, when the controller 21 of the image forming apparatus 10 rotates the cylindrical container 56 of the toner container, by activating the motor for rotating the cylindrical container 56, the toner is supplied from the toner container.

Figure 6A:
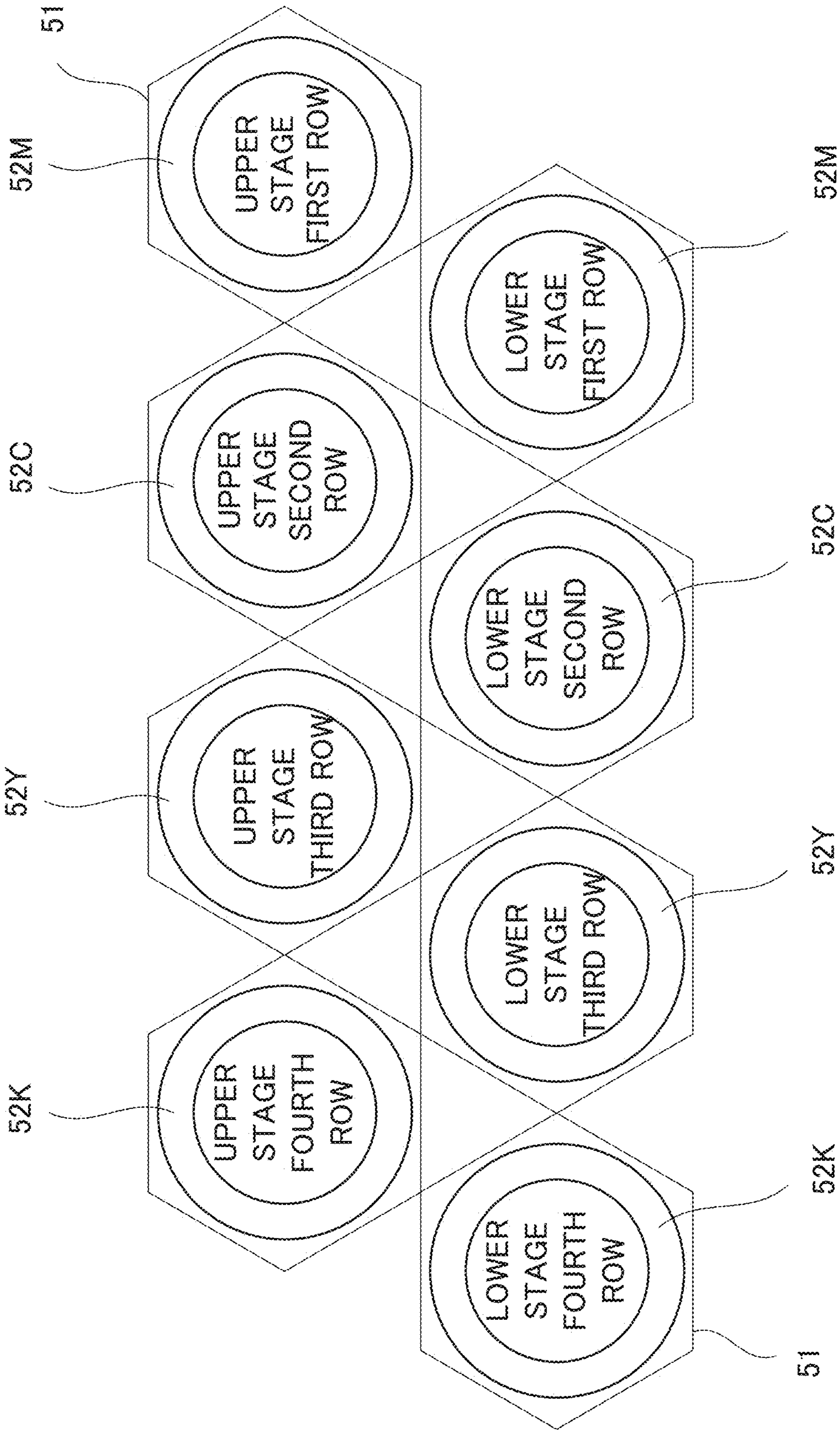
FIG. 6A to FIG. 6C are schematic drawings each showing an example of a combination of mounting positions of the toner containers, indicated by consumable item setting information.

Now, for example, when all of the toner containers 52M, 52C, 52Y, and 52K are mounted in the respective cylindrical housings 51 on the upper stage and the lower stage on the container mounting base 48, and the consumable item setting information KD is indicating the respective mounting positions of the toner containers 52M, 52C, 52Y, and 52K on the upper and lower stages, as shown in FIG. 6A, in other words when all of the toner containers 52M, 52C, 52Y, and 52K on the upper and lower stages are designated as the valid toner containers, the controller 21 of the image forming apparatus 10 rotates the cylindrical container 56 of each of the toner containers 52M, 52C, 52Y, and 52K on the upper and lower stages with the motor, thereby causing the toner containers 52M, 52C, 52Y, and 52K on the upper and lower stages, to supply the toner.

Figure 6B:
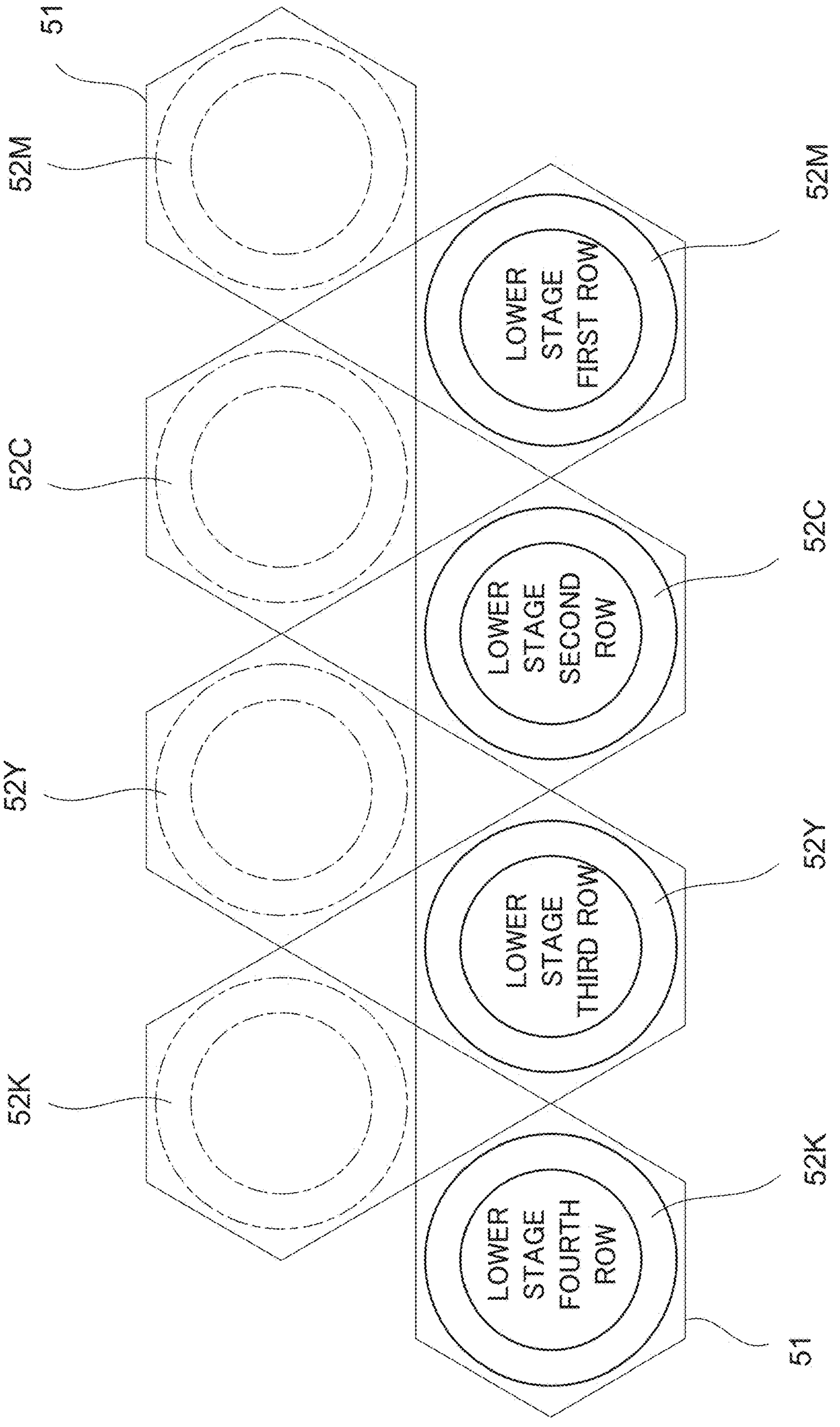

As another example, when the consumable item setting information KD is indicating the respective mounting positions of the toner containers 52M, 52C, 52Y, and 52K on the lower stage, as shown in FIG. 6B, in other words when the toner containers 52M, 52C, 52Y, and 52K on the lower stage are designated as the valid toner containers, the controller 21 of the image forming apparatus 10 rotates the cylindrical container 56 of each of the toner containers 52M, 52C, 52Y, and 52K on the lower stage with the motor, thereby causing the toner containers 52M, 52C, 52Y, and 52K on the lower stage to supply the toner.

In this case, the controller 21 keeps from driving the motor for rotating the cylindrical container 56 of the toner containers 52M, 52C, 52Y, and 52K on the upper stage, irrespective of whether these toner containers are mounted in the respective cylindrical housings 51 on the upper stage. Therefore, the toner is not supplied from the toner containers 52M, 52C, 52Y, and 52K on the upper stage.

Figure 6C:
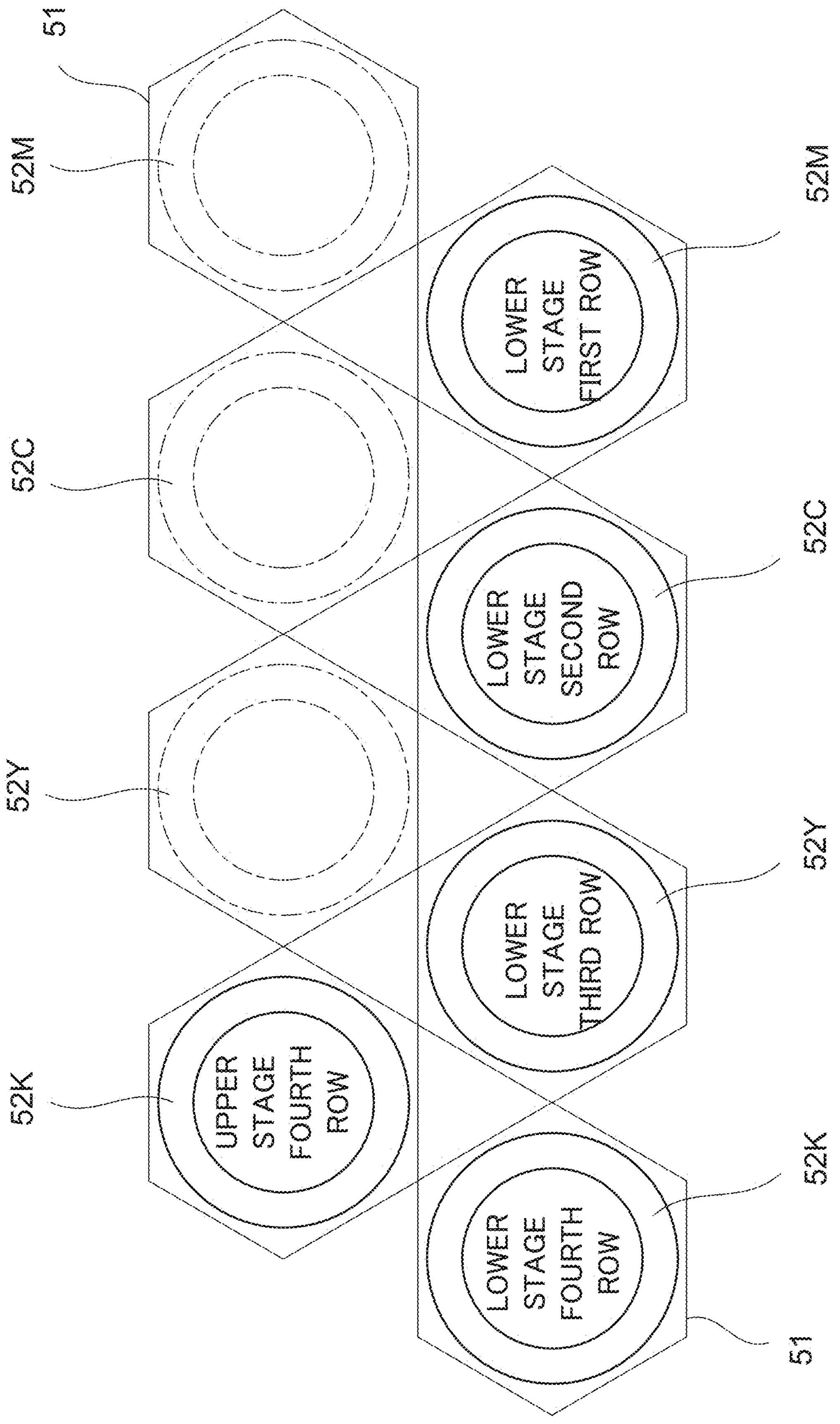

Further, when the consumable item setting information KD is indicating the respective mounting positions of the toner container 52K on the upper stage, and the toner containers 52M, 52C, 52Y, and 52K on the lower stage, as shown in FIG. 6C, in other words when the toner container 52K on the upper stage and the toner containers 52M, 52C, 52Y, and 52K on the lower stage are designated as the valid toner containers, the controller 21 of the image forming apparatus 10 rotates the cylindrical container 56 of the toner container 52K on the upper stage with the motor, thereby causing the toner container 52K on the upper stage to supply the toner, and rotates the cylindrical container 56 of each of the toner containers 52M, 52C, 52Y, and 52K on the lower stage with the motor, thereby causing the toner containers 52M, 52C, 52Y, and 52K on the lower stage to supply the toner.

In this case, the controller 21 keeps from driving the motor for rotating the cylindrical container 56 of the remaining toner containers 52M, 52C, and 52Y on the upper stage, irrespective of whether these toner containers are mounted in the respective cylindrical housings 51 on the upper stage. Therefore, the toner is not supplied from the toner containers 52M, 52C, and 52Y on the upper stage.

The consumption information SD about each of the toner containers 52M, 52C, 52Y, and 52K indicates, for example, whether the toner container is a legitimate product or an illegitimate product, the color of the toner, the remaining amount of the toner, the empty state, and whether the toner container is mounted or not. The controller 21 of the image forming apparatus 10 may include whether the toner container is a legitimate product or an illegitimate product, the color of the toner, the remaining amount of the toner, the empty state, and whether the toner container is mounted or not, selected by the service person through the operation device 12, or by the operation performed on the GUI displayed on the display device 11 through the touch panel 13, in the consumption information SD.

The controller 21 of the image forming apparatus 10 may decide the color of the toner, and whether the toner container is a legitimate product or an illegitimate product, with respect to each of the toner containers 52M, 52C, 52Y, and 52K, on the basis of the toner container information TD read by the RFID reader 24 provided on the cylindrical housing 51, from the RFID tag of the toner container.

The controller 21 decides the remaining amount of the toner, on the basis of a detection output of the remainder sensor 22 provided on the cylindrical housing 51, with respect to each of the toner containers 52M, 52C, 52Y, and 52K. The controller 21 decides whether the toner container is empty, on the basis of a detection output of the empty sensor 23 provided on the cylindrical housing 51, with respect to each of the toner containers 52M, 52C, 52Y, and 52K. The controller 21 decides whether the toner container is mounted in the cylindrical housing 51, on the basis of a detection output of the container sensor 25 provided on the cylindrical housing 51, with respect to each of the toner containers 52M, 52C, 52Y, and 52K.

Referring now to a flowchart shown in FIG. 7, a control process for transmitting the consumption information SD of the toner containers 52M, 52C, 52Y, and 52K, from the image forming apparatus 10 to the information processing apparatus 30, will be described hereunder in detail.

When the power to the image forming apparatus 10 is turned on so that the image forming apparatus 10 is activated, the controller 21 of the image forming apparatus 10 makes access to the information processing apparatus 30 through the communication device 14, and transmits the consumable item setting information KD, retrieved from the non-volatile memory 17, to the information processing apparatus 30 through the communication device 14 (step S101).

Upon receipt of the consumable item setting information KD through the communication device 34 (step S201), the controller 41 of the information processing apparatus 30 identifies and acquires the mounting position of the toner containers indicated by the consumable item setting information KD, in other words the mounting position of the toner containers that may supply the toner (step S202). The controller 41 displays the identified mounting position of the toner containers, on the screen of the display device 31 (step S203).

Figure 8A:
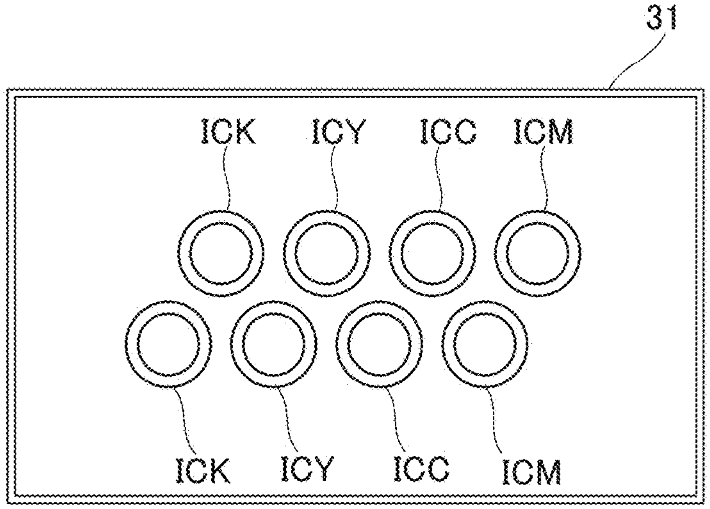
FIG. 8A to FIG. 8C are schematic drawings each showing an example of a combination of icons of the toner containers, displayed on the screen of a display device of the information processing apparatus.

For example, when the consumable item setting information KD is indicating the respective mounting positions of the toner containers 52M, 52C, 52Y, and 52K on the upper and lower stages, as shown in FIG. 6A, the controller 41 displays the icons ICM, ICC, ICY, and ICK respectively representing the toner containers 52M, 52C, 52Y, and 52K on the upper stage, and the icons ICM, ICC, ICY, and ICK respectively representing the toner containers 52M, 52C, 52Y, and 52K on the lower stage, on the screen of the display device 31, as shown in FIG. 8A.

Figure 8B:
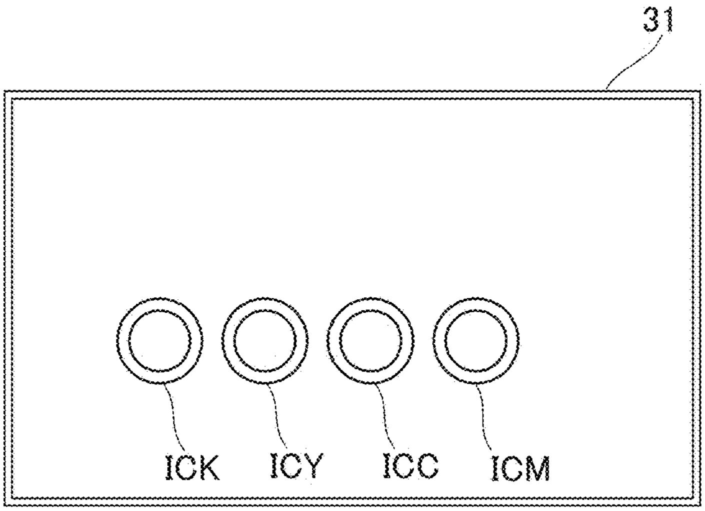

As another example, when the consumable item setting information KD is indicating the respective mounting positions of the toner containers 52M, 52C, 52Y, and 52K on the lower stage, as shown in FIG. 6B, the controller 41 displays the icons ICM, ICC, ICY, and ICK respectively representing the toner containers 52M, 52C, 52Y, and 52K on the lower stage, on the screen of the display device 31, as shown in FIG. 8B.

Figure 8C:
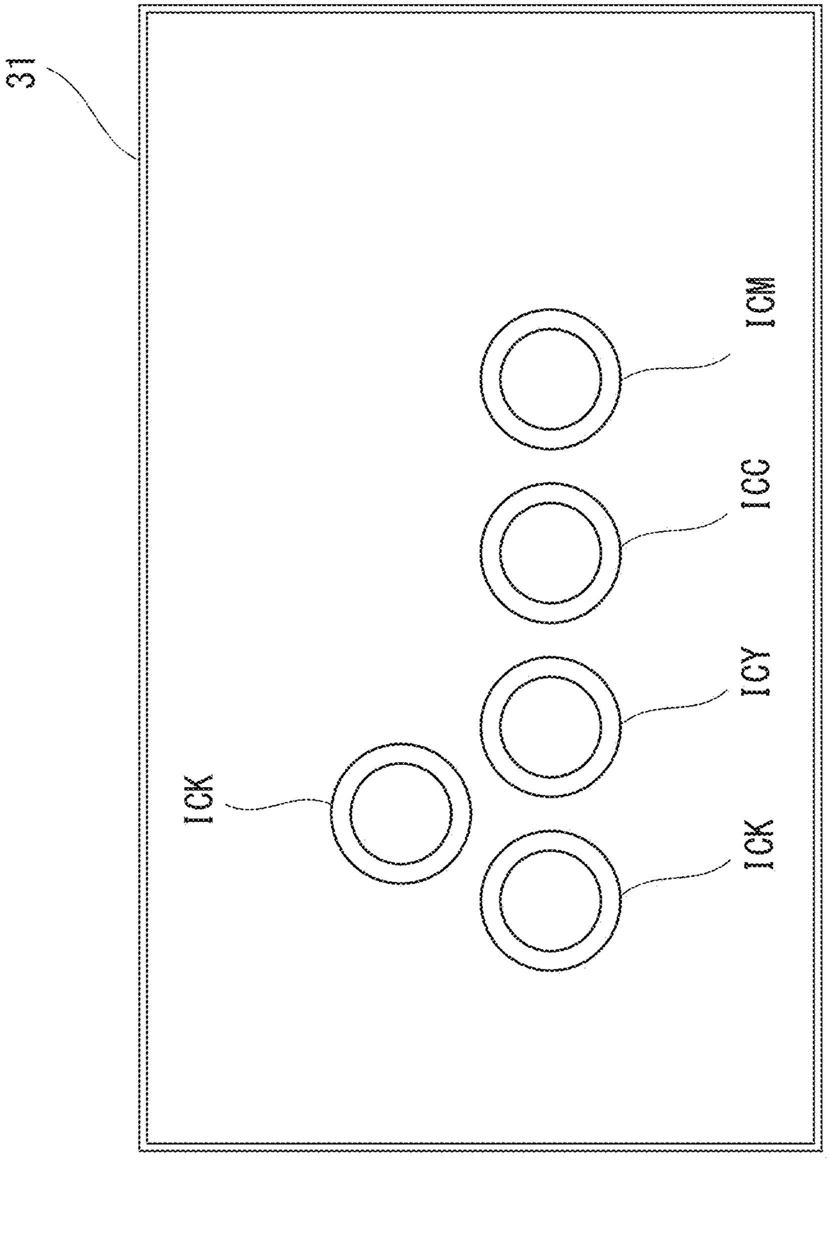

Further, when the consumable item setting information KD is indicating the respective mounting positions of the toner container 52K on the upper stage, and the toner containers 52M, 52C, 52Y, and 52K on the lower stage, as shown in FIG. 6C, the controller 41 displays the icon ICK representing the toner container 52K on the upper stage, and the icons ICM, ICC, ICY, and ICK respectively representing the toner containers 52M, 52C, 52Y, and 52K on the lower stage, on the screen of the display device 31, as shown in FIG. 8C.

The controller 41 of the information processing apparatus 30 selects one of the mounting positions of the respective toner containers, acquired at step S202 (step S205), each time a predetermined period of time elapses (e.g., one hour cycle), or when a predetermined time of the day reaches (step S204). The controller 41 transmits the selected mounting position of the toner container, and the request for transmission of the consumption information SD, to the image forming apparatus 10 through the communication device 34 (step S206).

Upon receipt of the mounting position of the toner container, and the request for transmission of the consumption information SD, through the communication device 14 (step S102), the controller 21 of the image forming apparatus 10 generates the consumption information SD of the toner container corresponding to the mounting position received (step S103). The controller 21 transmits the mounting position of the toner container and the consumption information SD thereof, to the information processing apparatus 30 through the communication device 14 (step S104).

Upon receipt of the mounting position of the toner container and the consumption information SD thereof, through the communication device 34 (step S207), the controller 41 of the information processing apparatus 30 stores the mounting position of the toner container and the consumption information SD thereof, in the storage device 38 (step S208).

The controller 41 of the information processing apparatus 30 decides whether the warning about the toner container should be displayed, on the basis of the consumption information SD of the toner container (step S209). Upon deciding that the warning should be displayed (Yes at step S209), the controller 41 displays the warning about the toner container, on the screen of the display device 31 (step S210).

For example, the controller 41 identifies the color of the toner and the remaining amount thereof accommodated in the toner container, indicated by the consumption information SD, and decides whether the remaining amount of the toner is equal to or less than a predetermined threshold (step S209). Upon deciding that the remaining amount of the toner is equal to or less than the threshold (Yes at step S209), the controller 41 displays the warning indicating the color of the toner in the toner container, and the fact that the remaining amount of the toner is insufficient, on the screen of the display device 31 (step S210).

As another example, the controller 41 decides whether the consumption information SD of the toner container is indicating that the toner container is empty (step S209). Upon deciding that the consumption information SD is indicating that the toner container is empty (Yes at step S209), the controller 41 displays the warning indicating the color of the toner in the toner container, and the fact that the toner container is empty, on the screen of the display device 31 (step S210).

As another example, the controller 41 decides whether the consumption information SD of the toner container is indicating that the toner container is not mounted in the cylindrical housing 51 (step S209). Upon deciding that the consumption information SD is indicating that the toner container is not mounted (Yes at step S209), the controller 41 displays the warning indicating the color of the toner in the toner container, and the fact that the toner container is not mounted, on the screen of the display device 31 (step S210).

Examples of the displaying method of the warning include changing the color of the icon representing the toner container about which the warning has been outputted, and displaying a message indicating the content of the warning.

Still further, the controller 41 of the information processing apparatus 30 decides whether the consumption information SD of the toner container is indicating that the toner container is an illegitimate product (step S209). Upon deciding that the consumption information SD is indicating that the toner container is an illegitimate product (Yes at step S209), the controller 41 displays the warning indicating that the toner container is an illegitimate product, on the screen of the display device 31 (step S210). In this case, the controller 41 displays a message indicating the content of the warning, and erases the icon corresponding to the toner container decided to be an illegitimate product.

The controller 41 of the information processing apparatus 30 decides whether any of the mounting positions is remaining unselected, among the mounting positions of the toner containers acquired at step S202 (step S211). Upon deciding that one or more mounting positions are unselected yet (Yes at step S211), the controller 41 selects another mounting position of the toner container, out of the mounting positions remaining unselected (step S212). The controller 41 transmits the selected other mounting position of the toner container, and the request for transmission of the consumption information SD, to the image forming apparatus 10 through the communication device 34 (step S206).

Upon receipt of the other mounting position of the toner container, and the request for transmission of the consumption information SD, through the communication device 14 (step S102), the controller 21 of the image forming apparatus 10 generates the consumption information SD of the toner container corresponding to the other mounting position received (step S103). The controller 21 transmits the mounting position of the toner container and the consumption information SD thereof, to the information processing apparatus 30 through the communication device 14 (step S104).

Then like the operation described above, upon receipt of the mounting position of the toner container and the consumption information SD thereof (step S207), the controller 41 of the information processing apparatus 30 stores the mounting position of the toner container and the consumption information SD thereof, in the storage device 38 (step S208), decides whether the warning about the toner container should be displayed (step S209), and displays, upon deciding that the warning should be displayed (Yes at step S209), the warning about the toner container, on the screen of the display device 31 (step S210).

The controller 41 decides whether any of the mounting positions is remaining unselected, among the mounting positions of the toner containers acquired at step S202 (step S211), selects, upon deciding that one or more mounting positions are unselected yet (Yes at step S211), another mounting position of the toner container, out of the mounting positions remaining unselected (step S212), and transmits the selected other mounting position of the toner container, and the request for transmission of the consumption information SD, to the image forming apparatus 10 (step S206).

Upon receipt of the mounting position of the toner container, and the request for transmission of the consumption information SD (step S102), the controller 21 of the image forming apparatus 10 generates the consumption information SD of the toner container corresponding to the mounting position received (step S103), and transmits the mounting position of the toner container and the consumption information SD, to the information processing apparatus 30 (step S104).

Figure 7:
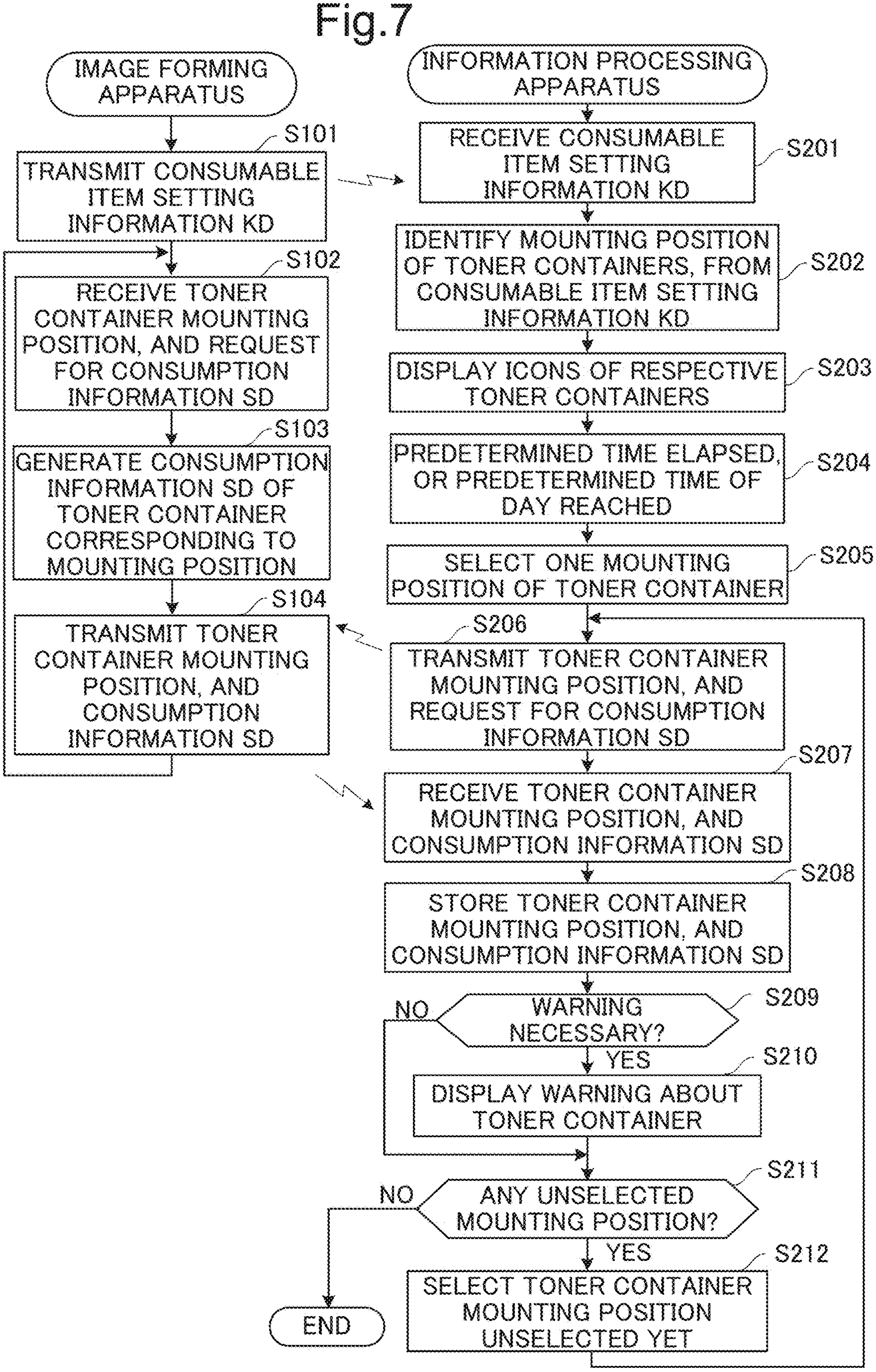
FIG. 7 is a flowchart showing a process for transmitting consumption information of the toner container, from the image forming apparatus to the information processing apparatus.

Upon deciding that there is no mounting position of the toner container remaining unselected, among the mounting positions acquired at step S202, in other words that all the mounting positions acquired have been selected (No at step S211), the controller 41 of the information processing apparatus 30 finishes the operation specified in FIG. 7.

Now, in order to properly perform the maintenance work for the image forming apparatus, it is necessary to collect and manage the consumption information regarding the consumption of the toner in the toner container, or consumption information regarding the consumption of the ink in the ink cartridge. To do so, for example, such consumption information may be transmitted and received between the image forming apparatus and the information processing apparatus. In the case of transmitting and receiving the consumption information of the toner or ink, between the image forming apparatus and the information processing apparatus, with respect to each of a plurality of toner containers or a plurality of ink cartridges provided in the image forming apparatus, it is preferable to reduce the communication volume of the information, thereby making the communication more efficient, while sufficiently transmitting the necessary information.

According to the aforementioned known technique to estimate the usage of consumable items, the offline estimation device provides the estimation of the usage of the toner or ink in the printing apparatus. However, no reference is made to the technique to efficiently transmit and receive the information about the consumption of the toner or ink, with respect to each of a plurality of toner containers or a plurality of ink cartridges.

According to the foregoing embodiment, in contrast, the consumption information SD is transmitted from the image forming apparatus 10 to the information processing apparatus 30, with respect to each of the mounting positions of the respective toner containers, indicated by the consumable item setting information KD, in other words with respect to each of the toner containers that supplies the toner. For example, when the consumable item setting information KD indicates the respective mounting positions of the toner containers 52M, 52C, 52Y, and 52K on the upper and lower stages, as shown in FIG. 6A, the consumption information SD of each of the toner containers 52M, 52C, 52Y, and 52K on the upper and lower stages is transmitted from the image forming apparatus 10, to the information processing apparatus 30, as shown in FIG. 9A.

As another example, when the consumable item setting information KD indicates the respective mounting positions of the toner containers 52M, 52C, 52Y, and 52K on the lower stage, as shown in FIG. 6B, the consumption information SD of each of the toner containers 52M, 52C, 52Y, and 52K on the lower stage is transmitted from the image forming apparatus 10, to the information processing apparatus 30, as shown in FIG. 9B.

Further, when the consumable item setting information KD indicates the mounting position of the toner container 52K on the upper stage, and the respective mounting positions of the toner containers 52M, 52C, 52Y, and 52K on the lower stage, as shown in FIG. 6C, the consumption information SD of each of the toner container 52K on the upper stage, and toner containers 52M, 52C, 52Y, and 52K on the lower stage, is transmitted from the image forming apparatus 10, to the information processing apparatus 30, as shown in FIG. 9C.

Accordingly, the consumption information SD is not transmitted from the image forming apparatus 10 to the information processing apparatus 30, with respect to the toner container from which the toner is not to be supplied. As result, the communication volume of the information between the image forming apparatus 10 and the information processing apparatus 30 can be reduced, while the necessary information is properly transmitted.

According to the foregoing embodiment, the controller 41 of the information processing apparatus 30 decides whether the warning about the toner container should be displayed, on the basis of the consumption information SD (step S209), and upon deciding that the warning should be displayed (Yes at step S209), the controller 41 displays the warning about the toner container, on the screen of the display device 31 (step S210). Although the controller 41 is configured to display the warning about the toner container, with respect to each of the toner containers, in the embodiment, the disclosure is not limited to such embodiment.

For example, the controller 41 of the information processing apparatus 30 may be configured to accept in advance, the selection of the toner container about which the warning is to be displayed, according to the operation of the service person performed on the operation device 32, or on the GUI displayed on the display device 31 through the touch panel 33. As an example, it will be assumed here that the service person has selected the toner containers 52M, 52C, 52Y, and 52K on the lower stage, as the subject about which the warning is to be displayed.

In this case, the controller 41 of the information processing apparatus 30 displays the warning about the toner container on the screen of the display device 31 (step S210), upon deciding that the warning about the toner containers 52M, 52C, 52Y, and 52K on the lower stage should be displayed (Yes at step S209). The controller 41 does not decide whether the warning should be displayed, with respect to the toner containers 52M, 52C, 52Y, and 52K on the upper stage, and therefore does not display the warning on the screen of the display device 31.

Likewise, when the service person selects the toner containers 52M, 52C, 52Y, and 52K on the upper stage as the subject about which the warning is to be displayed, the controller 41 of the information processing apparatus 30 displays only the warning about the toner containers 52M, 52C, 52Y, and 52K on the upper stage, on the screen of the display device 31.

Alternatively, the service person may select the toner containers 52M, 52C, 52Y, and 52K on the upper and lower stages, as the common subject about which the warning is to be displayed. In this case, the controller 41 of the information processing apparatus 30 decides whether the warning about the toner container should be displayed, on the basis of the consumption information SD of each pair of toner containers on the upper and lower stages accommodating therein the toner of the same color (step S209), and upon deciding that the warning about both of the pair of toner containers should be displayed (Yes at step S209), the controller 41 displays the warning about the toner container on the screen of the display device 31 (step S210).

The controller 21 of the image forming apparatus 10 may decide, in addition to transmitting the mounting position of the toner container and the consumption information SD to the information processing apparatus 30 through the communication device 14 (step S104), whether the warning about the toner container should be displayed, on the basis of the consumption information SD, as does the controller 41 of the information processing apparatus 30, and may display, upon deciding that the warning should be displayed, the warning about the toner container, on the screen of the display device 11.

In addition, the controller 21 of the image forming apparatus 10 may display, when the service person selects the toner container about which the warning is to be displayed, only the warning about the selected toner container, on the screen of the display device 11, as does the controller 41 of the information processing apparatus 30.

The controller 41 of the information processing apparatus 30 may decide whether a destination error of the toner container has occurred, on the basis of the consumption information SD, and display the warning about the toner container on the screen of the display device 31, upon deciding that the destination error has occurred.

According to the foregoing embodiment, the controller 41 of the information processing apparatus 30 selects one of the mounting positions of the toner containers, each time a predetermined period of time elapses (e.g., one hour cycle), or when a predetermined time of the day reaches, and transmits the selected mounting position of the toner container, and the request for transmission of the consumption information SD of the toner container, to the image forming apparatus 10 through the communication device 34. However, the disclosure is not limited to such embodiment.

For example, upon accepting the selection of one of the mounting positions of the toner containers, made by the service person through the operation device 32, the controller 41 of the information processing apparatus 30 may transmit the mounting position of the toner container that has been selected at any desired time, and the request for transmission of the consumption information SD, to the image forming apparatus 10 through the communication device 34.

Further, although the image forming apparatus 10 is exemplified by the electrophotographic apparatus in the foregoing embodiment, the disclosure is also applicable to an ink jet image forming apparatus including a plurality of ink cartridges. In the case of the ink jet image forming apparatus, the controller of the ink jet image forming apparatus generates the consumable item setting information KD, indicating the mounting position of each of the ink cartridges, and the consumption information SD indicating, with respect to each of the ink cartridges, whether the ink cartridge is a legitimate product or an illegitimate product, the color of the ink in the ink cartridge, the remaining amount of the ink, the empty state of the ink cartridge, and whether the ink cartridge is mounted, and executes the operation described with reference to FIG. 7, with the toner containers for the electrophotographic printing substituted with the ink cartridges.

Further, the configurations and processings described in the embodiment with reference to FIG. 1 to FIG. 9C are merely exemplary, and in no way intended to limit the disclosure to those configurations and processings.

While the present disclosure has been described in detail with reference to the embodiments thereof, it would be apparent to those skilled in the art that various changes and modifications may be made therein within the scope defined by the appended claims.

What is claimed is:

1. An image forming system comprising:

an image forming apparatus; and an information processing apparatus, wherein the image forming apparatus includes:

an image forming device that forms an image on a recording sheet;

a plurality of consumable items that each supply a consumable material to be used for forming the image;

an operation device;

a first communication device that performs data communication with the information processing apparatus; and a first controller including a processor, and configured to, when the processor executes a control program;

designate a consumable item that can supply a consumable material, as a valid consumable item, among the plurality of consumable items, based on a selection made by a service person through the operation device at a time of initial setting of the image forming apparatus;

generate consumable item setting information indicating a mounting position of the valid consumable item;

cause the first communication device to transmit the consumable item setting information to the information processing apparatus;

generate consumption information of the valid consumable item, when the first communication device receives a request for transmission of the consumption information of the valid consumable item; and cause the first communication device to transmit the consumption information to the information processing apparatus, and the information processing apparatus includes:

a second communication device that performs data communication with the image forming apparatus;

a storage device; and a second controller including a processor, and configured to, when the processor executes a control program;

identify the valid consumable item indicated by the consumable item setting information, when the second communication device receives the consumable item setting information;

cause the second communication device to transmit the request for transmission of the consumption information of the valid consumable item, to the image forming apparatus; and store the consumption information of the valid consumable item in the storage device, when the second communication device receives the consumption information.

2. The image forming system according to claim 1, wherein the information processing apparatus further includes a first display device, and the second controller of the information processing apparatus displays, upon deciding, when the second communication device receives the consumption information, that a warning should be displayed on a basis of the consumption information, the warning about the valid consumable item based on the consumption information, on the first display device.

3. The image forming system according to claim 1, wherein the image forming device forms the image on the recording sheet, through an electrophotography process using toner which is the consumable material, and each of the plurality of consumable items is a toner container for accommodating the toner therein, removably mounted in the image forming apparatus.

4. The image forming system according to claim 3, wherein the plurality of toner containers accommodates therein the toner of a same color, and the first controller designates at least one toner container that can supply the toner of the same color, as the valid toner container, among the plurality of toner containers, and generates the consumable item setting information of the at least one valid toner container.

5. The image forming system according to claim 4, wherein the information processing apparatus further includes a first display device, and the second controller of the information processing apparatus displays, upon deciding, when the second communication device acquires the consumption information of the at least one valid toner container, that a warning should be displayed on a basis of the consumption information, the warning about the at least one valid toner container based on the consumption information, on the first display device.

6. The image forming system according to claim 4, wherein the image forming apparatus further includes a second display device, and the first controller of the image forming apparatus generates the consumption information of the at least one valid toner container, and displays, upon deciding that a warning should be displayed on a basis of the consumption information, the warning about the at least one valid toner container based on the consumption information, on the second display device.

7. The image forming system according to claim 1, wherein the consumption information indicates a remaining amount of the consumable material accommodated in the consumable item, an empty state of the consumable item, whether the consumable item is mounted or not, or whether the consumable item is a legitimate product or an illegitimate product.

8. The image forming system according to claim 1, wherein the image forming apparatus further includes a non-volatile memory for storing therein the consumable item setting information.

9. The image forming system according to claim 1, wherein the first controller keeps from allowing the first communication device to transmit the consumable item setting information of a consumable item not designated as the valid consumable item, to the information processing apparatus.

* * * * *